United States Patent [19]

Mizutani

[11] Patent Number: 5,532,533
[45] Date of Patent: Jul. 2, 1996

[54] SERVO MOTOR INTEGRAL WITH CONTROL APPARATUS

[75] Inventor: Takao Mizutani, Aichi, Japan

[73] Assignee: Mitsubishi Denki Kabushiki Kaisha, Tokyo, Japan

[21] Appl. No.: 223,100

[22] Filed: Apr. 4, 1994

[30] Foreign Application Priority Data

Apr. 2, 1993 [JP] Japan .................................. 5-077020

[51] Int. Cl.⁶ .................................................. H02K 11/00
[52] U.S. Cl. ........................ 310/68 B; 310/68 R; 310/71
[58] Field of Search .............................. 310/68 B, 68 R, 310/89, DIG. 3, DIG. 6, 45, 71

[56] References Cited

U.S. PATENT DOCUMENTS

| | | | |
|---|---|---|---|
| 3,644,765 | 2/1972 | Janson | 310/68 B |
| 3,809,935 | 5/1974 | Kristen et al. | 310/68 B |
| 3,984,712 | 10/1976 | Hill | 310/71 |
| 4,642,496 | 2/1987 | Kerviel et al. | 310/68 B |
| 4,773,829 | 9/1988 | Vettori | 310/68 R |
| 4,888,509 | 12/1989 | Tomasek | 310/68 B |
| 4,952,830 | 8/1990 | Shirakawa | 310/68 B |
| 4,988,905 | 1/1991 | Tolmie, Jr. | 310/68 B |
| 5,006,744 | 4/1991 | Archer et al. | 310/89 |
| 5,038,088 | 8/1991 | Arends et al. | 310/68 R |
| 5,053,670 | 10/1991 | Kosugi | 310/328 |

FOREIGN PATENT DOCUMENTS

| | | | |
|---|---|---|---|
| A1389181 | 1/1965 | France . | |
| A2153307 | 5/1973 | France . | |
| A3913501 | 3/1990 | Germany . | |
| A4120665 | 12/1992 | Germany . | |
| 60-102839 | 6/1985 | Japan | H02K 11/00 |
| 1-214243 | 8/1989 | Japan | 310/68 R |
| 2211039 | 8/1990 | Japan | H02K 11/00 |
| 3-253242 | 11/1991 | Japan | 310/68 B |
| 4242 | 1/1992 | Japan | H02K 11/00 |
| 4210753 | 7/1992 | Japan | H02K 11/00 |
| 1473026 | 4/1989 | U.S.S.R. | 310/68 B |

OTHER PUBLICATIONS

Patent Abstracts Of Japan, vol. 9, No. 318 (E-366) (2041) 13 Dec. 1985 & JP-A-60-152 247 (Toshiba K.K.) 10 Aug. 1985.

Advertisement "Escap Integrated Angular Step Dectector" in the German Trade Journal "Elecktronik" 1982, No. 8, p. 159.

*Primary Examiner*—Clayton E. LaBalle
*Attorney, Agent, or Firm*—Sughrue, Mion, Zinn, Macpeak & Seas

[57] ABSTRACT

A servo motor integral with a control apparatus has a servo motor section, an amplifier section and a partition body which constitutes a partition between an amplifier section and a servo motor section. The housing which contains the integrated apparatus provides support for the several elements of each section, including printed circuit board, bearings and position/velocity detector. The several elements are arranged, designed and appropriately sealed so that a low cost and effective apparatus results.

10 Claims, 13 Drawing Sheets

SERVO MOTOR INTEGRAL WITH CONTROL APPARATUS

BACKGROUND OF THE INVENTION

1. Field of the Invention

The present invention relates to a servo motor integral with a control apparatus used with a numerically controlled machine tool or the like, in which an amplifier, a detector and a servo motor are integrated.

2. Description of the Background Art

The conventional integration of an amplifier, a detector and a servo motor used with a numerically controlled machine tool or the like, i.e., a servo motor integral with a control apparatus, is manufactured in a process, as disclosed in Japanese Laid-Open Patent Publication No. SH060-102839. As disclosed therein, the amplifier, detector and servo motor are assembled in their respective manufacturing lines and they are then integrated and assembled onto the iron core of the servo motor in a final line.

FIG. 13 is a vertical sectional view showing a first conventional design and FIG. 14 is a system configuration diagram of that conventional design. In FIGS. 13 and 14, a servo motor section 1 has a rotor 2 wherein a rotor core consisting of a permanent magnet 4 has a required number of poles and is fixed to a rotary shaft 3. Along the shaft is an opposite-to-load side ball bearing 5 and a load side ball bearing 6, the ball bearings 5, 6 are fitted to and supported by a housing 7a of one bracket 7 and a housing 8a of another bracket 8, respectively. A stator 9 is constituted by a core 10 and a coil 11 wound around the core 10 and is fixed to a frame 12. Fitting portions 12a, 12b at the ends of the frame 12 are fitted into fitting portions 7b, 8b at the ends of the brackets 7 and 8 and secured by screws (not shown). 13 represents a flexible lead wire which is connected to the coil 11 and drawn through a hole 12c formed in the frame 12 and whose front end is connected with a plug 14.

A detector 15 is constituted by, for example, an encoder having a boss 16 which is secured to the shaft end of the rotary shaft 3 by a nut 17 and on which a rotary scale 18 is fixed. The rotary scale 18 is generally a chrome-deposited glass and is etched to form slits of a required pattern. A stationary scale 19, which has been manufactured in the same manner as the rotary scale 18, has formed thereon the required pattern and has fixed thereon a 30 to 100 µm gap set from the rotary scale 18 to provide a large output change.

A light-emitting device 20 such as an LED, a plurality of light-receiving devices 21, and a U-shaped installation frame 22 are secured to the bracket 7, on which the light-emitting device 20, the stationary scale 19, the light-receiving devices 21 and a printed circuit board 23 are secured. The printed circuit board 23 is loaded with a signal processing circuit 24, connected with a plug 26 by a lead wire 25, and also is connected with the light-emitting device 20 by a lead wire 24a. It is to be understood that 27 denotes the cover of the detector 15.

The assembly includes an amplifier section 28. A chassis 29 acts as an outer wall body of the amplifier section 28. The chassis 29 is provided with fins 29a. The chassis is secured to the frame 12 of the servo motor section 1. A printed circuit board 30 is loaded with a power circuit 31 and a control circuit 32, and is supported by the chassis 29 via a spacer 33. It is to be understood that 34 designates the cover of the chassis 29, a socket 36 is used with a lead wire 35 for electrical connection of the power circuit 31 and the servo motor section 1, and a socket 38 is connected at the front end of a lead wire 37 for electrical connection of the control circuit 32 and the detector 15.

The unit has a fan motor 39, which is equipped with a blade 39a, and is secured to the bracket 7 by an installation leg 39b. A fan cover 40 forms a wind path. It should be noted that when it is not necessary to cool the servo motor section 1 and the amplifier section 28, the fan motor 39 and the fan cover 40 need not be installed. It is to be understood that 41 denotes a hold-down plate, 42 represents a locking ring, and 43 designates a preloaded spring.

As another conventional design, a servo motor integral with a control apparatus is also manufactured in a process, as disclosed in Japanese Laid-Open Patent Publication No. HEI4-210753. In that process, after the assembly of the servo motor is complete, each part of the detector is assembled in the rotary shaft direction of the bracket on the opposite-to-load side of the servo motor section and, further, each part of the amplifier is assembled thereto.

FIG. 15 is a vertical sectional view showing this second conventional design and its system configuration diagram is identical to that of FIG. 14. Referring to FIG. 15, a stator 9 consists of a core 10 and a coil 11 wound around the core 10 and having reinforcing rings 44, 45 fixed to the core 10 by welding or the like. 44a and 45a designate fitting portions of the reinforcing rings 44, 45 and the brackets 8, 7. The fitting portions 44a, 45a are fitted into fitting portions 8b, 7b at the ends of the brackets 8, 7 and secured by screws (not shown). 13 represents flexible lead wires connected to the coil 11, drawn through a hole 7c formed in the bracket 7, and connected with a printed circuit board 46.

Amplifier section 28 is provided in the axial end of the rotary shaft 3 of the detector 15. 46 and 48 designate printed circuit boards. The printed circuit board 46 is loaded with the power circuit 31 and the printed circuit board 48 is loaded with the control circuit 32, and is supported by spacer 49. It should be noted that the other arrangement is identical to that of the first conventional art shown in FIGS. 13 and 14 and will therefore not described, except that U-shaped installation frame 22 is replaced with straight installation frame 47.

Operation will now be described. When the amplifier section 28 is switched on in the first conventional design shown in FIGS. 13 and 14, the power circuit 31, the control circuit 32 and the detector 15 are set to the operation state. When an external command signal is input to the control circuit 32 at this time, the power circuit 31 switches a high voltage, which has been converted from a three-phase alternating current into a direct current, under the control of the amplified command signal, to convert it into a three-phase alternating current of required frequency, voltage and current.

This current is then supplied to the coil 11 of the stator 9 in the servo motor section 1 via the lead wires 35, 13 to generate a revolving magnetic field and also cause it to work on the permanent magnet 4 to torque the rotor 2, thereby rotating the rotary shaft 3.

Accordingly, the rotary scale 18 of the detector 15 also rotates and the light of the light emitting device 20 is transmitted and intercepted according to the slits. The transmitted light is converted into any of a variety of photocurrents by the light receiving devices 21 according to the slit patterns of the rotary scale 18 and the stationary scale 19. This photocurrent is processed by the signal processing circuit 24 for use as a detector signal.

This detector signal is then fed back to the control circuit 32 via the lead wires 25, 37 for use as a velocity/rotary position signal and is compared with the command signal to rotate the servo motor section 1 to zero a difference therebetween, whereby an external machine (not shown) is drive-controlled.

The temperature rise of the servo motor section 1, the detector 15 and the amplifier section 28, which occurs due to heat generated by the resistance loss of a current flowing in the coil 11, heat generated by the switching loss of a transistor (not shown) in the power circuit 31, and other factors, is suppressed because of a cooling wind produced by the rotation of the fan motor 39 which cools the frame 12 of the servo motor section 1, the housing of the bracket 7, and the cooling fins 29a of the chassis 29 in the amplifier section 28.

In order to assemble said servo motor integral with the control apparatus, the servo motor section 1, the amplifier section 28, and the rotary scale 18, the rotary portion of the boss 16 and stationary portions consisting of the other parts in the detector 15, pre-assembled in respective assembly lines, are gathered and assembled in a final assembly line. Finally the cover 27, the fan motor 39 and the fan cover 40 are fitted to the subassembly.

It is to be understood that the second conventional design shown in FIGS. 14 and 15 also operates in the same manner as the first conventional design and will not be described.

The conventional servo motor, integral with the control apparatus which has the amplifier section fitted integrally on the core of the servo motor, as in the first conventional design, is large in dimension at right angles to the rotary shaft direction of the servo motor section. It especially has a disadvantage in that a ballscrew direct-drive feature, having a machine table driving ballscrew passing through, cannot be used because installation space under the table cannot be provided.

Also, since the amplifier section and the servo motor section are manufactured independently, processes required for the connection with the lead wires of the servo motor section and the detector make it difficult to automate lead wire connection, and the components must be assembled in a clean room to prevent dirt from sticking to the rotary scale and stationary scale and from lodging in the gap between the rotary and stationary portions of the detector. Also, because of their complicated surfaces, the servo motor section and the amplifier section, which must clean before they are transferred to the clean room, are difficult to be cleaned, resulting in poor workability and high costs.

Further, in the servo motor cooled by the fan motor, the amplifier section is in the cooling wind path, and the cooling wind strikes against the amplifier section, increasing noise and lowering cooling efficiency.

In the servo motor having the amplifier section fitted in the rotary shaft direction of the opposite-to-load side bracket (as in the second conventional design), the long dimension in the rotary shaft direction of the servo motor section requires a larger installation floor area. Further the printed circuit boards located away from the opposite-to-load side ball bearing results in low supporting rigidity and large vibration of the printed circuit boards, whereby an electronic circuit component mounting section must be held firmly by reinforcing materials and the like.

Also, the printed circuit boards must be connected with the lead wires of the servo motor and the light emitting device. Further, there are many processes required for this connection work, and it is difficult to automate lead wire connection. Finally, the servo motor section and the amplifier section must be fully cleaned in the assembling of the rotary and stationary portions of the detector in a clean room. Naturally, since the amplifier section is not assembled as a single unit, each part must be cleaned, and evaluation cannot be made as a single unit. Hence, the workability of amplifier section fitting is low and costs are high.

Accordingly, an object of the present invention is to overcome these disadvantages by providing a servo motor, integral with a control apparatus, which is small in size and low in costs, vibration, noise and temperature rise.

SUMMARY OF THE INVENTION

In a servo motor integral with a control apparatus of the present invention, a partition body which constitutes a partition between an amplifier section and a servo motor section is provided, a housing which supports an opposite-to-load side bearing of the servo motor section and a portion which extends in the radial direction of the opposite-to-load side bearing from said housing are formed on the partition body, a printed circuit board in the amplifier section is fitted to the portion extending in the radial direction, a stationary portion of a detector which detects the velocity and/or rotary position of the servo motor section is fitted to the printed circuit board, and a rotary portion of the detector is disposed between the opposite-to-load side bearing of the servo motor section and a rotor core constituting a rotor.

In a servo motor integral with a control apparatus concerned with the present invention, the stationary portion of the detector is constituted by a signal processing circuit of the detector and an optical unit consisting of at least a semiconductor laser and a light receiving device. The rotary portion of said detector is constituted by at least a rotary scale, and the optical unit and the rotary scale are opposed to each other with a required gap provided therebetween.

In a servo motor integral with a control apparatus concerned with the present invention, coil lead extensions of a stator constituting the servo motor section and molded by a resin are coupled with a connection formed integrally with said resin, and said connection is disconnectibly coupled with a connection fitted to the printed circuit board of the amplifier section.

In a servo motor integral with a control apparatus concerned with the present invention, the contact length of the connection formed integrally with the resin which molds the stator and the connection fitted to the printed circuit board of the amplifier section is shorter than the fitting length of the housing which supports the opposite-to-load side bearing of the servo motor section and the bearing supported by said housing.

In a servo motor integral with a control apparatus concerned with the invention, the stator and the coil lead extensions of the servo motor section are molded integrally by the resin for use as a support, and the conductive portions of coil lead front ends which project from said coil lead extensions are connected to the conductive pattern of the printed circuit board of the amplifier section.

In a servo motor integral with a control apparatus concerned with this invention, a printed circuit board loaded with a power circuit in the amplifier section is molded integrally with the partition body by a high heat transfer resin.

In a servo motor integral with a control apparatus concerned with the present invention, at least one part of the partition body is extended, is coated with an electrical insulation material, and has a conductive pattern formed thereon.

In a servo motor integral with a control apparatus concerned with this invention, a hole is formed in the printed circuit board of the amplifier section and a cover of said amplifier section, and a portion opposed to a rotary shaft of the housing which supports the opposite-to-load side bearing of the servo motor section is extended in the rotary shaft direction to abut on said cover.

In a servo motor integral with a control apparatus concerned with the invention, a fan motor is provided, an installation seat of said fan motor is fitted to the cover of the amplifier section, and said cover is provided with a plurality of cooling fins.

In a servo motor integral with a control apparatus concerned with the invention, a plurality of cooling fins disposed on the outer periphery of the stator and molded integrally with said stator by a resin and the plurality of cooling fins formed and disposed integrally with the partition body of the amplifier section are identical in number and are disposed on straight lines in the rotary shaft direction of the servo motor section.

DESCRIPTION OF THE PREFERRED EMBODIMENTS

Figure 1:
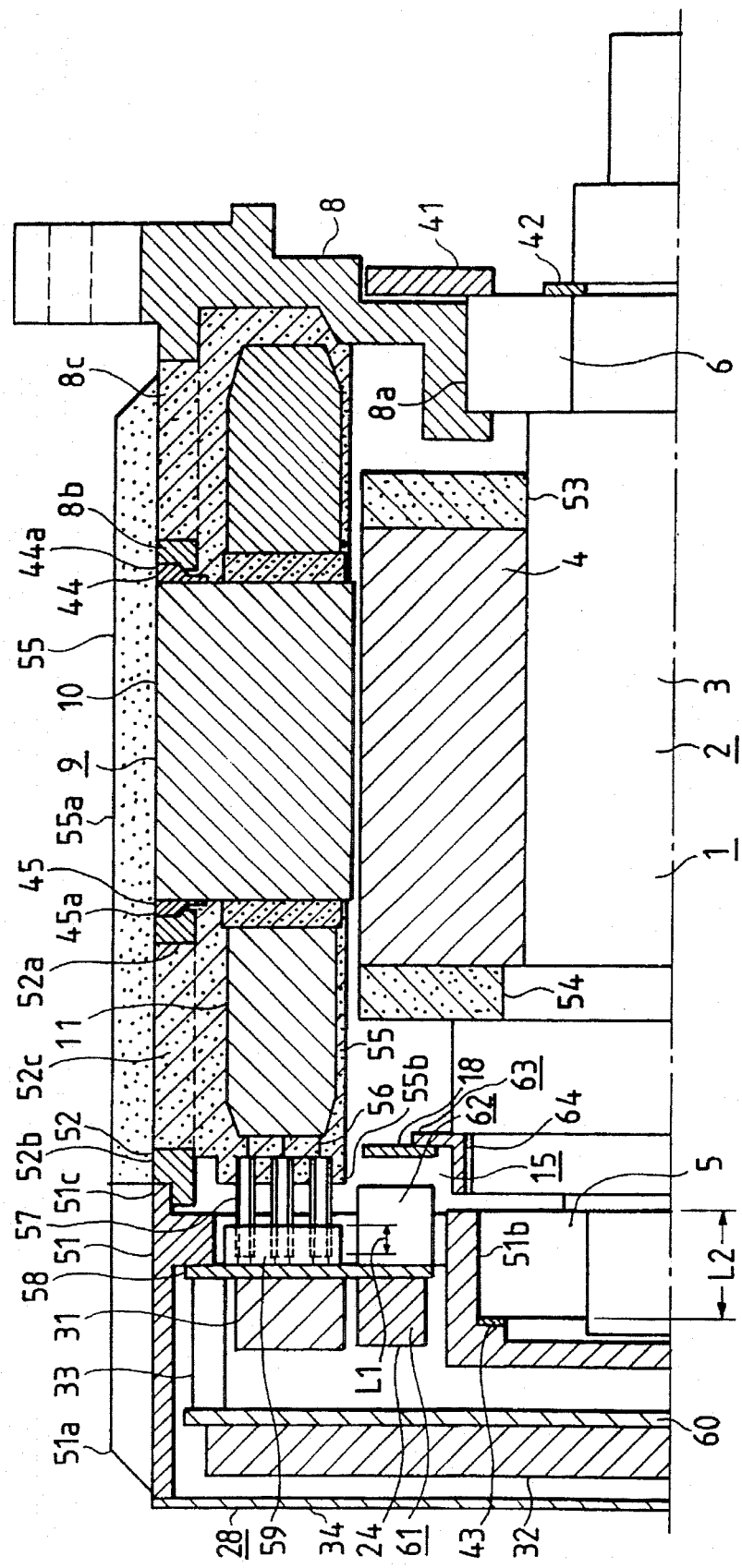
FIG. 1 is a vertical sectional view of a servo motor integral with a control apparatus illustrating a preferred embodiment of the invention.

An embodiment of the invention, which identifies several of the novel features, will be described with reference to FIGS. 1 and 2. In the drawings, parts identical or corresponding to those in the conventional designs are designated by identical reference characters and will not be described here.

FIG. 1 is a vertical sectional view of a servo motor integral with a control apparatus, showing an embodiment of the present invention. FIG. 2 is a partly expanded plan sectional view of a detector.

In FIG. 1, a partition-type chassis 51 constitutes a partition between the amplifier section 28 and the servo motor section 1. The outer walls of the chassis 51 are provided with a plurality of cooling fins 51a in a peripheral direction and a housing 51b thereof is fitted with an opposite-to-load side bearing 5. The bearing assembly is molded by diecast or the like integrally with a portion extending in the radial direction of the ball bearing 5 from the housing 51b. A bracket 52 is seen having a hole 52c opening toward the top of FIG. 1. An end fitting portion 52a of the bracket 52 fits in the fitting portion 45a of the reinforcing ring 45 and an end fitting portion 52b thereof fits in a fitting portion 51c of the chassis 51 to support the amplifier section 28 with respect to the servo motor section 1.

The rotor 2 is molded integrally by resins 53, 54 to cover the rotor core 4 constituted by a permanent magnet. The stator 9 is molded by a resin 55 integrally with the reinforcing rings 44, 45 and the brackets 52, 8, respectively. Further, cooling fins 55a are also molded integrally with the resin 55 via the hole 8c formed in the bracket 8 and the hole 52c formed in the bracket 52, respectively. Three coil lead extensions 56 of the stator 9 are brazed with three terminals 57 and form a plug 55b molded integrally with the resin 55. This plug 55b is designed to be disconnectibly coupled with a socket 59 automatically inserted into a printed circuit board 58. It is to be understood that the contact length L1 of the socket 59 and the terminals 57 is shorter than the fitting length L2 of the housing 51b and the bearing 5.

The printed circuit board 58 is fitted to the portion extending in the radial direction of the bearing 5 from the housing 51b and is loaded with the power circuit 31 and the signal processing circuit 24. A printed circuit board 60 is disposed in a layered fashion with the printed circuit board 58 via the spacer 33, is loaded with the control circuit 32, and is fixed to the chassis 51.

A stationary portion 61 of the detector 15, which consists of the signal processing circuit 24 and an optical unit 62, is fitted to the printed circuit board 58. A rotary portion 63 of the detector 15 consists of a rotary scale 18 applied and fixed to a boss 64. The boss 64 is screwed and fixed to the rotary shaft 3 and disposed between the ball bearing 5 and the permanent magnet 4 of the servo motor section 1. A gap, in which the rotary scale 18 and the optical unit 62 oppose against each other, is designed to be large.

Figure 2:
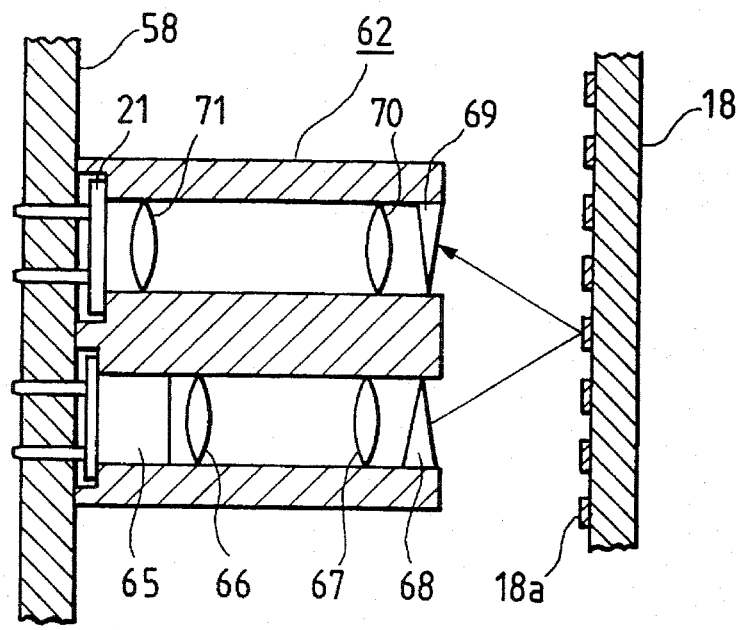
FIG. 2 is a partially expanded plan sectional view of a detector shown in FIG. 1.
Figure 14:
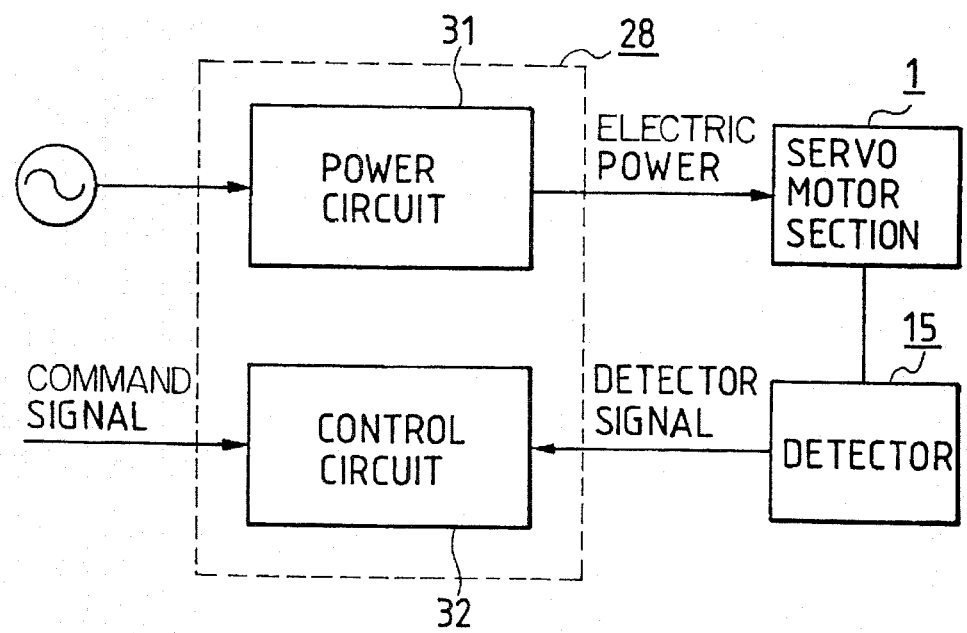
FIG. 14 is a system configuration diagram of the servo motor integral with the control apparatus known in the conventional art.

FIG. 2 is a partially expanded plan sectional view of the optical unit 62 and the rotary scale 18, wherein 65 designates a semiconductor laser, 66 and 70 denote condenser lenses, 67 and 71 indicate condenser lenses, 68 and 69 represent prisms, 18a denotes a required pattern of a mirror surface chrome-deposited to the rotary scale 18, and 21 designates a light receiving device.

The operation of the servo motor integral with the apparatus arranged as described above will now be described.

First, when the amplifier section 28 is powered up, the power circuit 31, the control circuit 32 and the detector 15 are set to the operating state. When an external command signal is input to the control circuit 32 at this time, the power circuit 31 switches a high voltage, which has been converted from a three-phase alternating current into a direct current, under the control of the amplified command signal to convert it into a three-phase alternating current of required frequency, voltage and current.

This is then supplied to the coil 11 of the stator 9 in the servo motor section 1 via the socket 59, the terminals 57 and the coil lead extensions 56 to generate a revolving magnetic field and causing it to work on the permanent magnet 4. In this manner, the rotor 2 is torqued to rotate the rotary shaft 3.

Accordingly, the rotary scale 18 of the detector 15 also rotates, and a light coming out of the semiconductor laser 65 is gathered by the condenser lens 66, focused by the condenser lens 67, angled by the prism 68, and irradiates the rotary scale 18. The light is reflected by the required pattern 18a of the rotary scale 18, angled by the prism 69, gathered by the condenser lens 70 and focused on the light receiving device 21 by the condenser lens 71. The light is converted into a photocurrent by the light receiving device 21 and processed by the signal processing circuit 24 for use as a detector signal. This detector signal is then fed back to the control circuit 32 for use as a velocity/rotary position signal, and is compared with the command signal to rotate the servo motor section 1 to zero a difference therebetween, whereby an external machine (not shown) is drive-controlled.

As described above, the servo motor integral with the control apparatus according to this embodiment of the present invention has the following features:

(1) The fitting portion 51c of the chassis 51 and the end 52b of the bracket 52 and further the housing 51b of the chassis 51 and the ball bearing 5 are fitted with each other to support the servo motor section 1 to eliminate the housing 51b from the bracket 52. In other words, the housing 51b of the chassis 51 in the amplifier section 28 serves as the housing of the ball bearing 5 to reduce the rotary shaft direction dimension.

(2) The stationary portion 61 of the detector 15 is fitted to the printed circuit board 58, there is no lead wire for connection, and the rotary portion 63 of the detector 15 is provided in a space between the ball bearing 5 and the rotor core 4 to reduce the rotary shaft direction dimension.

(3) The semiconductor laser 65, the condenser lenses 66, 70, the condenser lenses 67, 71, the prisms 66, 69, and the light receiving device 21 are integrated to act as the optical unit 62 to enable automatic insertion during assembly. Also, the optical system's use of the semiconductor laser 65 allows the gap from the rotary scale 18 to be larger.

(4) The resins 53, 54 cover the rotor 2, and the resin 55 covers the stator 9 to simplify the surface shape, whereby cleaning is facilitated and the amount of dirt stuck on the rotary scale 18 is reduced. Also, since the stator 9 is filled with the resin 55 molded integrally with the cooling fins 55a, heat generated by the resistance loss of the current flowing to the coil 11 is transmitted to the cooling fins 55a via the resin 55 and radiated to the outside.

(5) The resin 55 is molded integrally with the terminals 57 of the coil lead extensions 56 to form the plug 55b to be disconnectibly coupled with the socket 59, whereby the lead wires between the amplifier section 28 and the servo motor section 1 are minimized to prevent noise.

(6) The contact length L1 of the terminals 57 molded to the plug 55b and the socket 59 is shorter than the fitting length of the housing 51b of the chassis 51 and the ball bearing 5. Accordingly, the fitting of the opposite-to-load side bearing into the housing serves as a guide for the connection of the coil lead extensions of the servo motor rotor and the amplifier section to facilitate assembly.

(7) The printed circuit board 58 is disposed on the portion of the unit extending in the radial direction of the ball bearing 5 to reduce the rotary shaft direction dimension and increase the supporting rigidity of the printed circuit board 58.

(8) The amplifier section 28 is accommodated in the chassis 51 to enable assembling and evaluation as a single unit.

Figure 3:
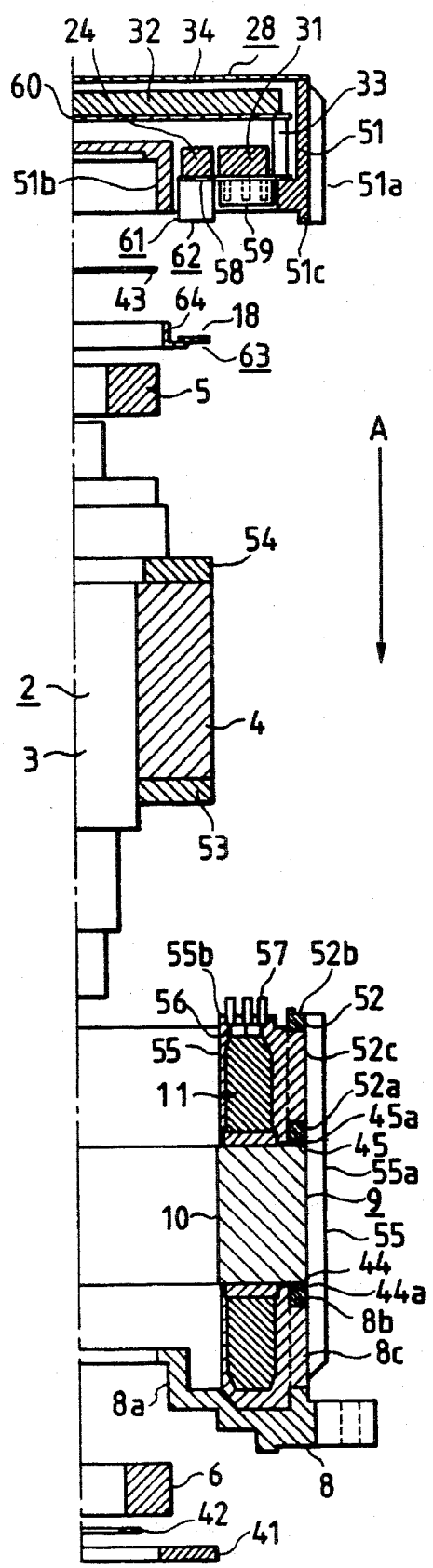
FIG. 3 illustrates a method of assembling a servo motor integral with a control apparatus according to the embodiment shown in FIG. 1.

As illustrated in an exploded arrangement diagram in FIG. 3, to assemble said servo motor integral with the control apparatus, several component steps are followed. For example, the rotor 2 is inserted into the stator 9 of the servo motor section 1, a jig (not shown) is used to prevent the permanent magnet 4 from being attracted to the core 10, and the rotary portion 63 of the detector 15 is assembled along with a preloaded spring 43. Also, the servo amplifier section 28 is fitted onto one ball bearing 5 for use as a guide, the socket 59 is fitted into the plug 55b, the amplifier section is fitted into the end 52b of one bracket 52, and the hold-down plate 41 is installed to prevent the rotary shaft 3 from moving in the rotary shaft direction, which completes the assembly.

Figure 4:
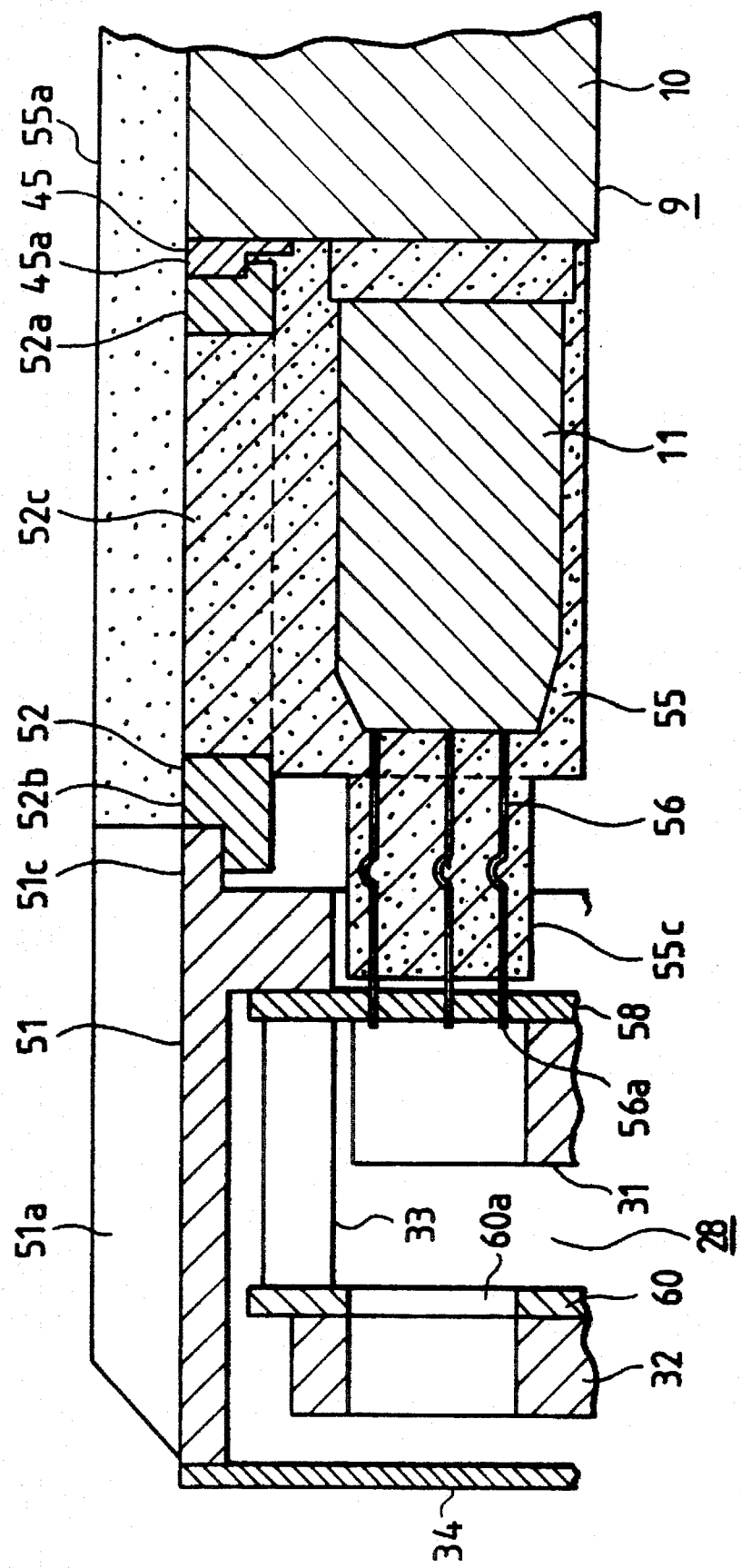
FIG. 4 is an expanded vertical sectional view of a connection of coil leads of a servo motor integral with a control apparatus illustrating another preferred embodiment of the invention.

An alternative feature of the invention will now be described with reference to FIG. 4, which is an expanded vertical sectional view of the coil lead connection. While the coil lead extensions 56 in the previously described embodiment 1 are connected to the socket 59 via the terminals 57, and then to the power circuit 31 of the printed circuit board 58, the coil lead front ends 56a in the servo motor integral with the control apparatus shown in FIG. 4 are deprived of the electrical insulation films and connected to the power circuit 31 of the printed circuit board 58. Also, a hole 60a is formed in the printed circuit board 60 and a support 55c is molded integrally with the coil lead extensions 56 by the resin 55.

The servo motor integral with the control apparatus according to this arrangement does not require the socket 59 and the terminals 57 shown in the previous embodiment. To make a connection, fixture can be done by soldering or with a screw holder (not shown) or the like after the cover 34 has been removed, and therefore assembling can be improved.

Figure 5:
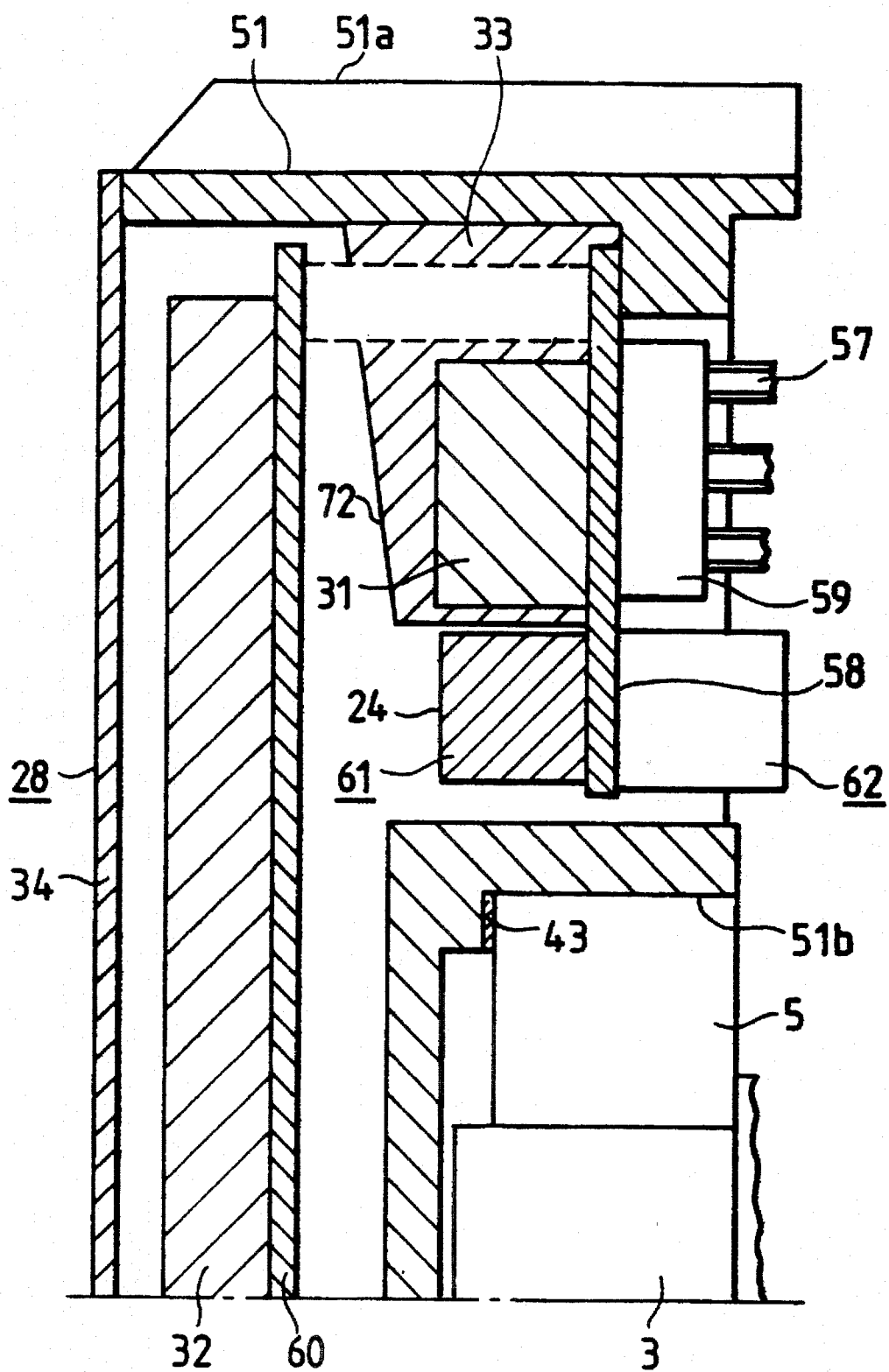
FIG. 5 is an expanded sectional view of an amplifier section illustrating a further feature of the invention.

Another embodiment of the present invention will now be described with reference to FIG. 5, which is an expanded vertical sectional view of the servo amplifier section 28. In FIG. 5, 72 indicates a heat transfer resin which has been used to mold the power circuit 31 integrally with the printed circuit board 58 and the chassis 51.

In the servo motor integral with the control apparatus according to this arrangement, heat generated by switching loss, etc., of the transistor (not shown) in the power circuit 31 is transmitted to the cooling fins 51a of the chassis 51 via the resin 72 and radiated to the outside. Accordingly, a servo motor, integral with the control apparatus and high in cooling efficiency, can be provided.

Figure 6:
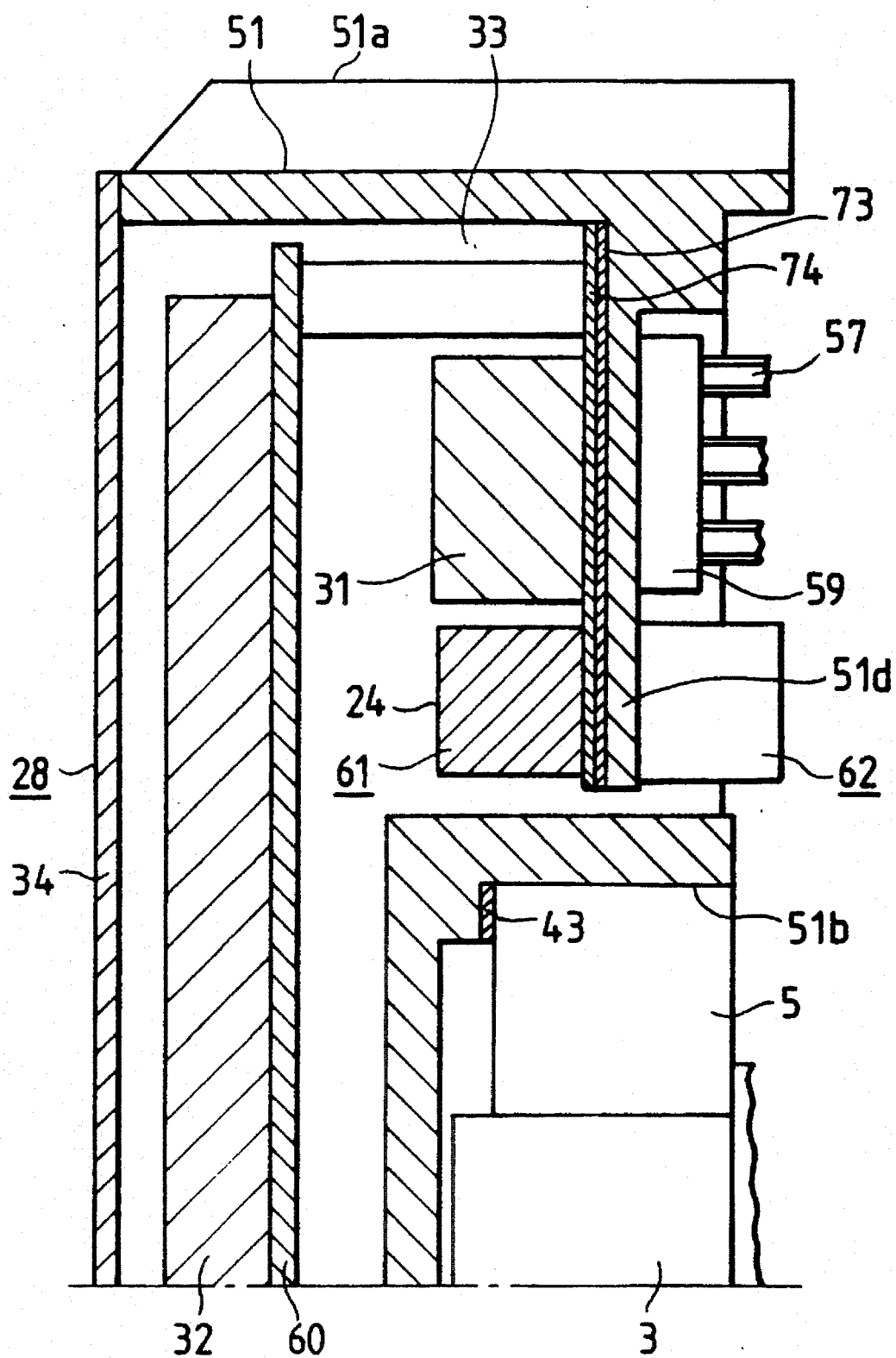
FIG. 6 is an expanded sectional view of an amplifier section illustrating added details of the invention.

A further embodiment of the invention will now be described with reference to FIG. 6, which is an expanded vertical sectional view of the servo amplifier section 28. In FIG. 6, 51d indicates an extension of the chassis 51, 73 designates an electrical insulation material coated on the extension 51d, and 74 denotes a conductive pattern formed on the electrical insulation material 73 and acting as a metal circuit board.

In the servo motor integral with the control apparatus according to this arrangement, heat generated by the switching loss, etc., of the transistor (not shown) in the power circuit 31 is immediately transmitted to the extension 51d of the chassis 51 and radiated to the outside. Hence, a servo motor, integral with the control apparatus and of high cooling efficiency, can be provided.

Figure 7:
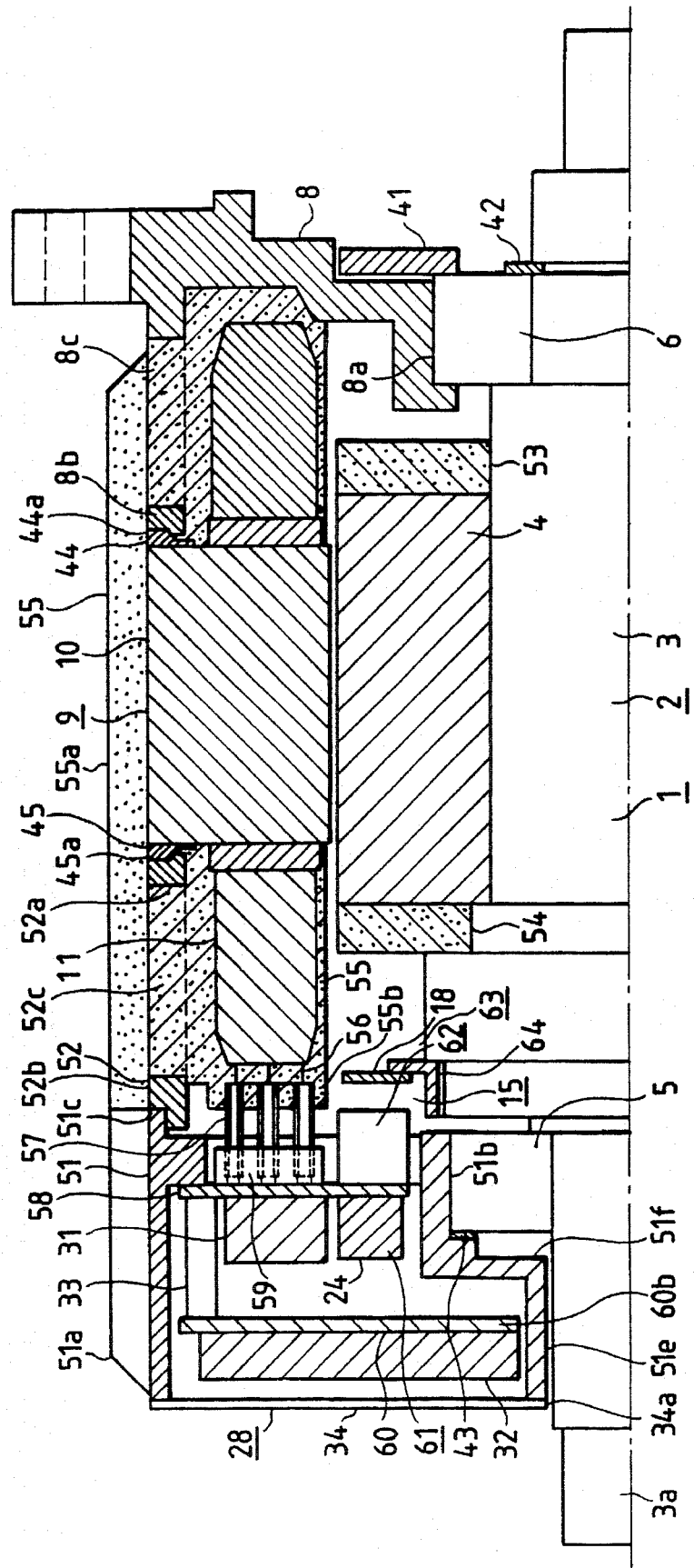
FIG. 7 is a vertical sectional view of a servo motor integral with a control apparatus illustrating another embodiment of the invention.

Another embodiment of the invention will now be described with reference to FIG. 7. In FIG. 7, 3a indicates a shaft end of the rotary shaft 3 which has been extended in the rotary shaft direction and projects from a hole 60b formed in the printed circuit board 60 and an end 34a of the cover 34. 51e represents an extension of an opposed portion 51f of the housing 51b of the chassis 51 to the rotary shaft 3 and this extension 51e abuts on the end 34a of the cover 34.

In the servo motor integral with the control apparatus according to this arrangement, it is more difficult for water and/or oil to enter the amplifier section 28, and therefore a servo motor integral with a control apparatus of a two-shaft end feature can be provided.

Figure 8:
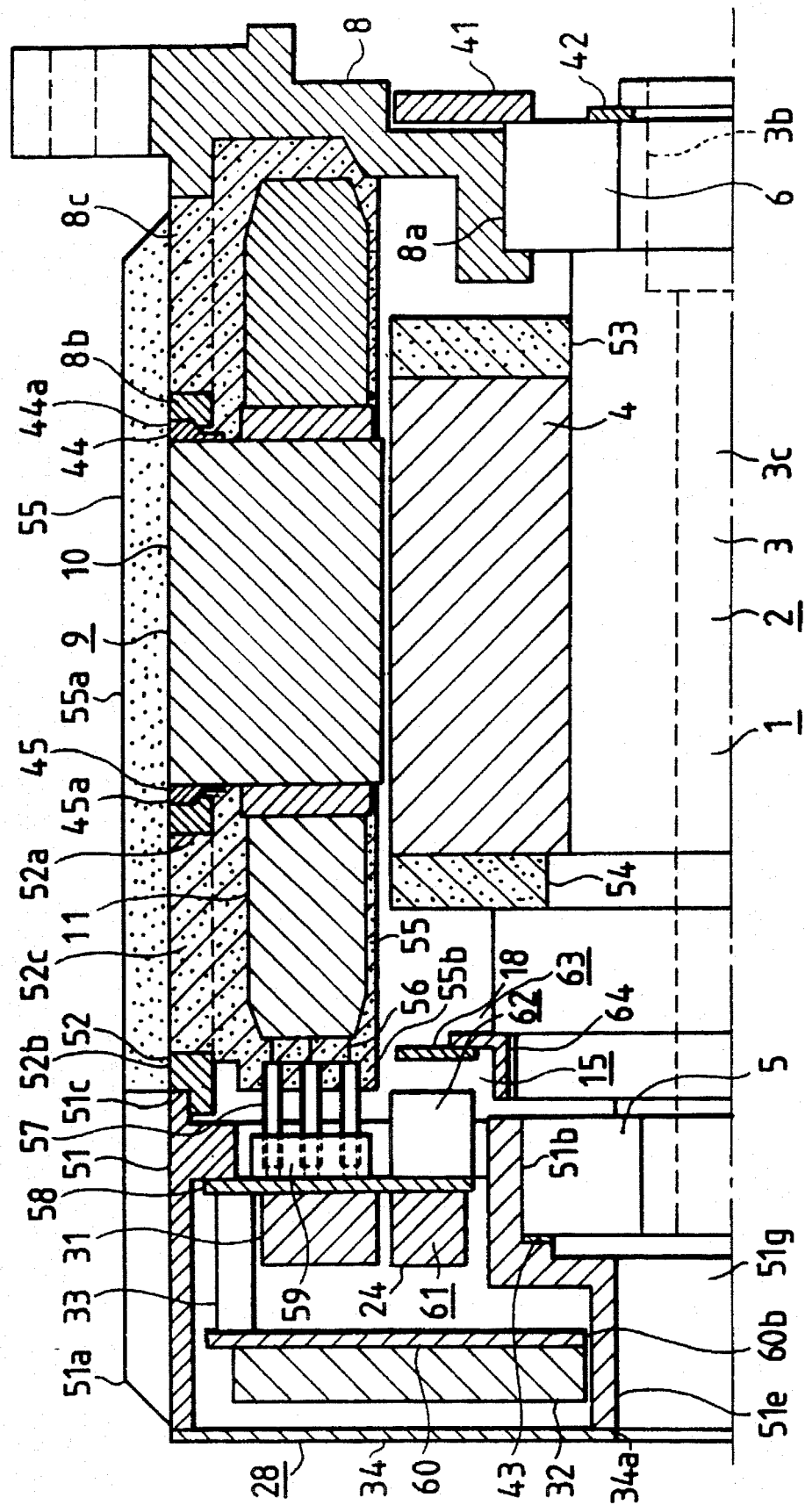
FIG. 8 is a vertical sectional view of a servo motor integral with a control apparatus illustrating an alternative embodiment of the invention.

Art alternative embodiment of the invention will now be described with reference to FIG. 8. In FIG. 8, the extension 51e of the housing 51b of the partition-type chassis 51 passes through the hole 60b formed in the printed circuit board 60 and abuts the end 34a of the cover 34. The fitting portion 3b of the rotary shaft 3 fixes a ballscrew nut (not shown), and a hollow portion 51g of the extension 51e and a hollow portion 3c of the rotary shaft 3 are designed such that a ballscrew (not shown) passes through.

In the servo motor integral with the control apparatus according to this arrangement, it is more difficult for water and/or oil to enter the amplifier section 28, and therefore the servo motor integral with control apparatus which can be driven directly by the ballscrew can be provided.

Figure 9:
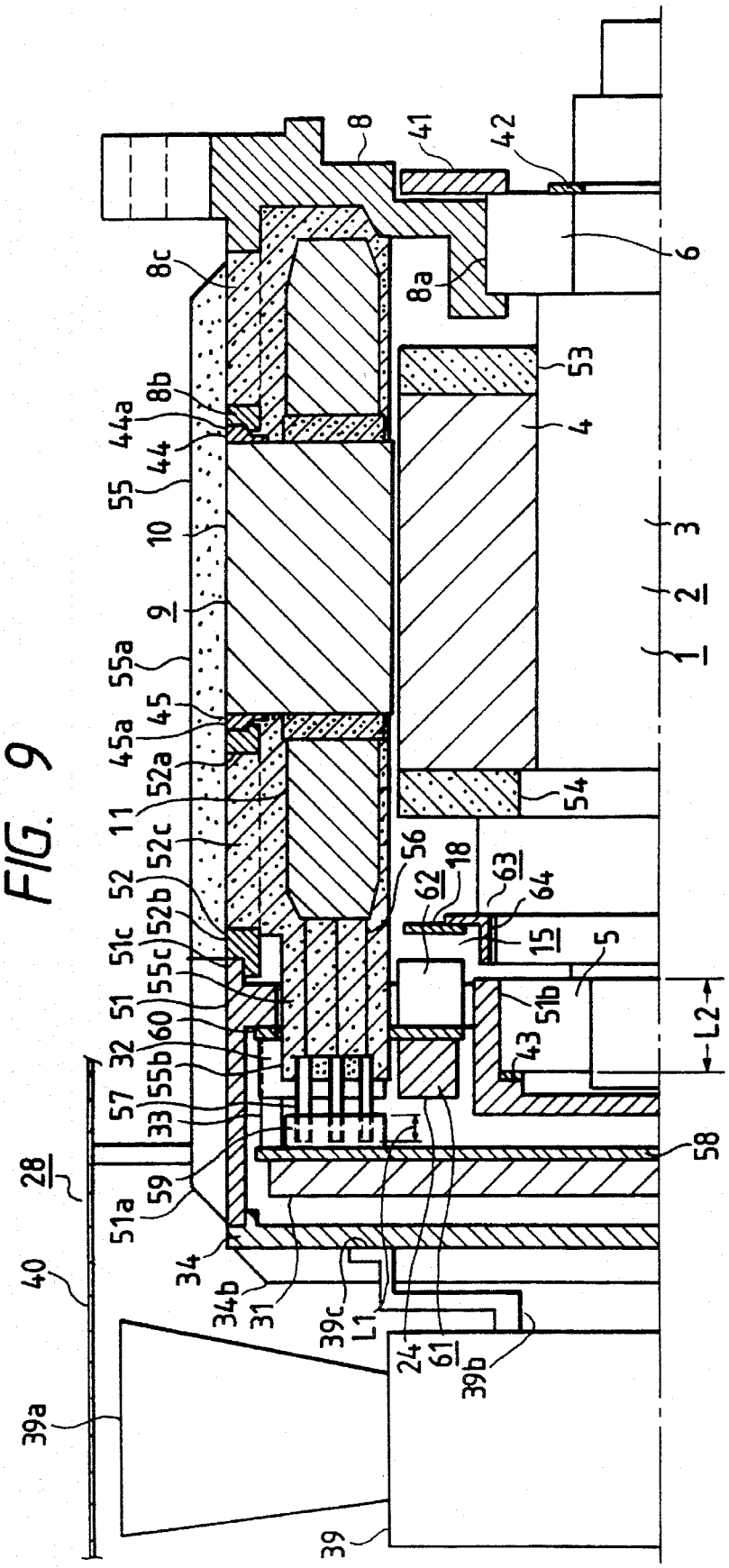
FIG. 9 is a vertical sectional view of a servo motor integral with a control apparatus illustrating a preferred embodiment of the invention.

An additional embodiment of the invention will now be described with reference to FIG. 9. In FIG. 9, 39 designates a fan motor which is equipped with a blade 39a and secured to an installation seat 34c of the cover 34 of the amplifier section 28 by an installation leg 39b. 34b denotes a plurality of cooling fins and 40 indicates a fan cover which forms a wind path between itself and the chassis 51.

In the servo motor integral with the control apparatus according to this arrangement, the fan motor 39 can be installed easily, the amplifier section 28 does not shut up the wind path, and noise does not increase. Also, the amplifier section 28 improves in cooling efficiency.

Figure 10:
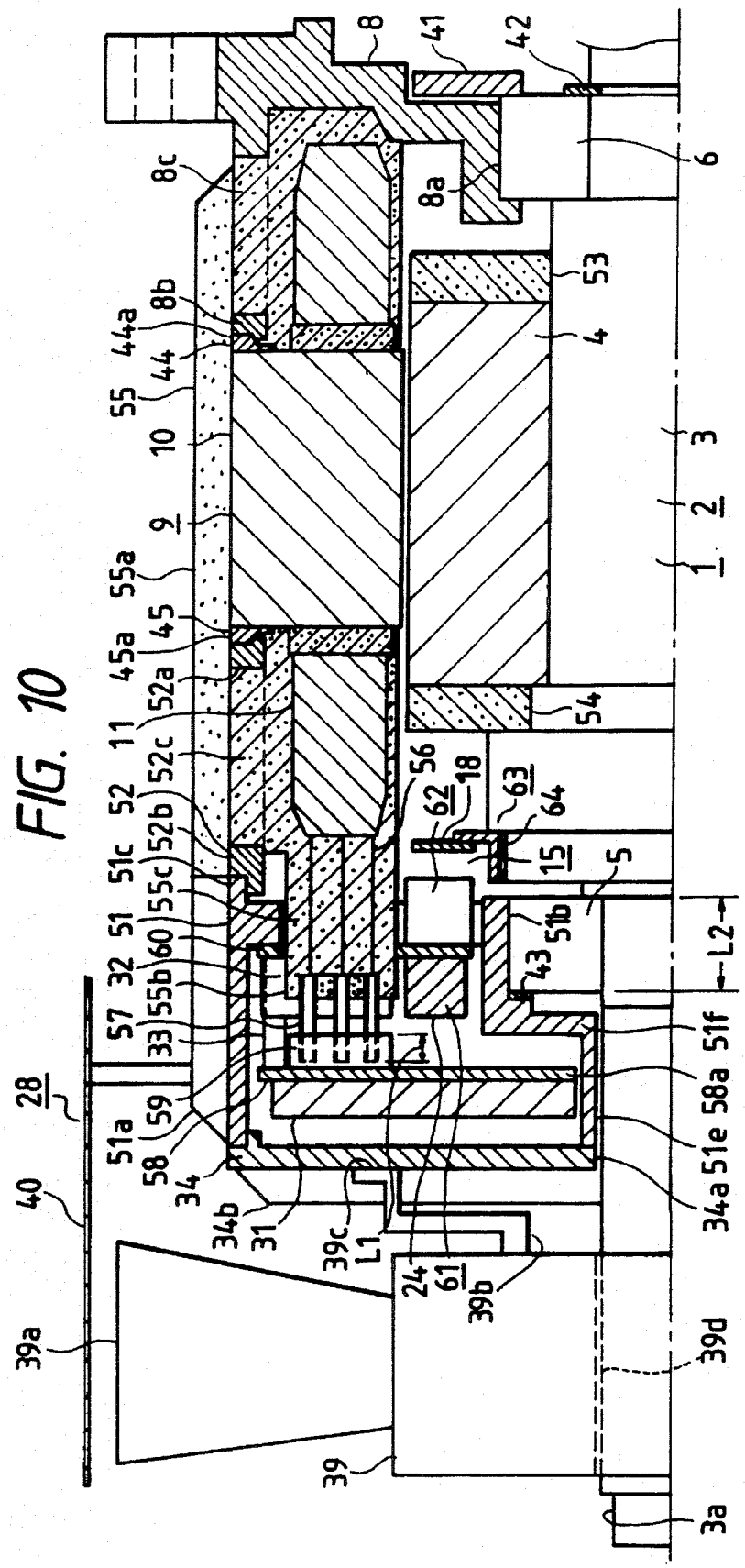
FIG. 10 is a vertical sectional view of a servo motor integral with a control apparatus illustrating an alternative feature of the invention.

An alternative embodiment of the invention will now be described with reference to FIG. 10. In FIG. 10, 39 indicates a fan motor having a hollow hole 39c from which the shaft end 3a of the rotary shaft 3 protrudes. Accordingly, the cooling wind circulates through the hollow hole 39c to further improve the cooling efficiency of the amplifier section 28.

Figure 11:
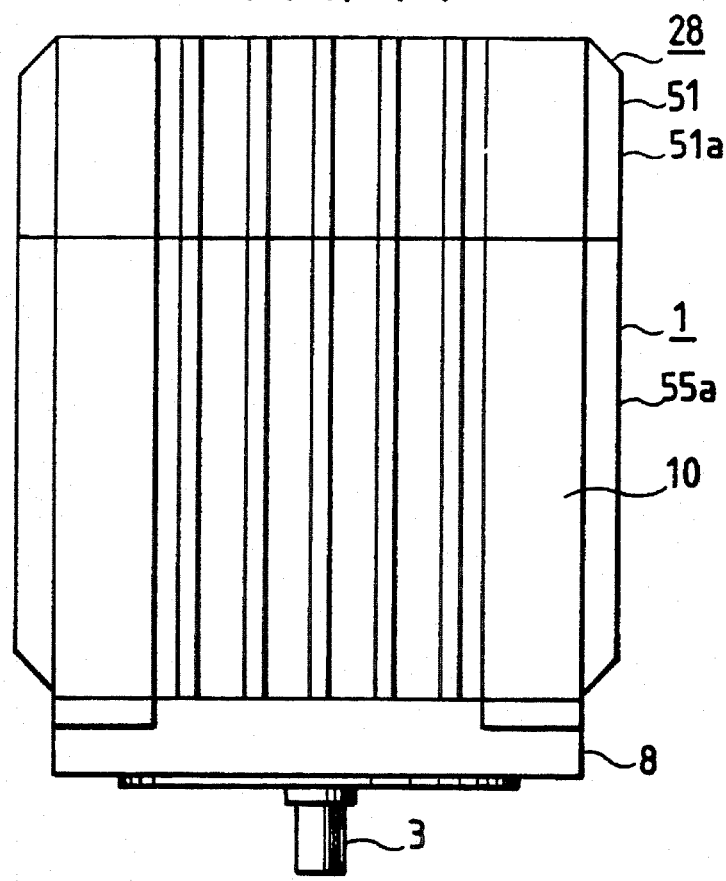
FIG. 11 is a vertical sectional view of a servo motor integral with a control apparatus illustrating features of the present invention.
Figure 12:
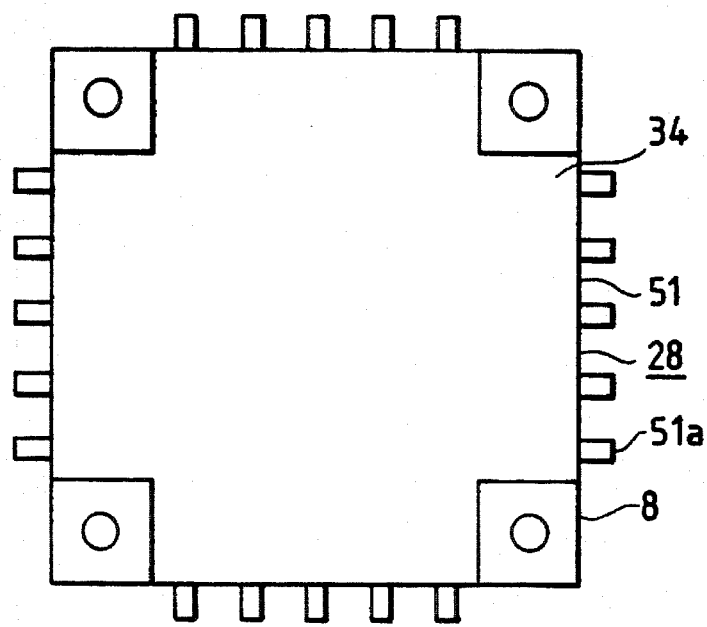
FIG. 12 is a top view of FIG. 11.
Figure 13:
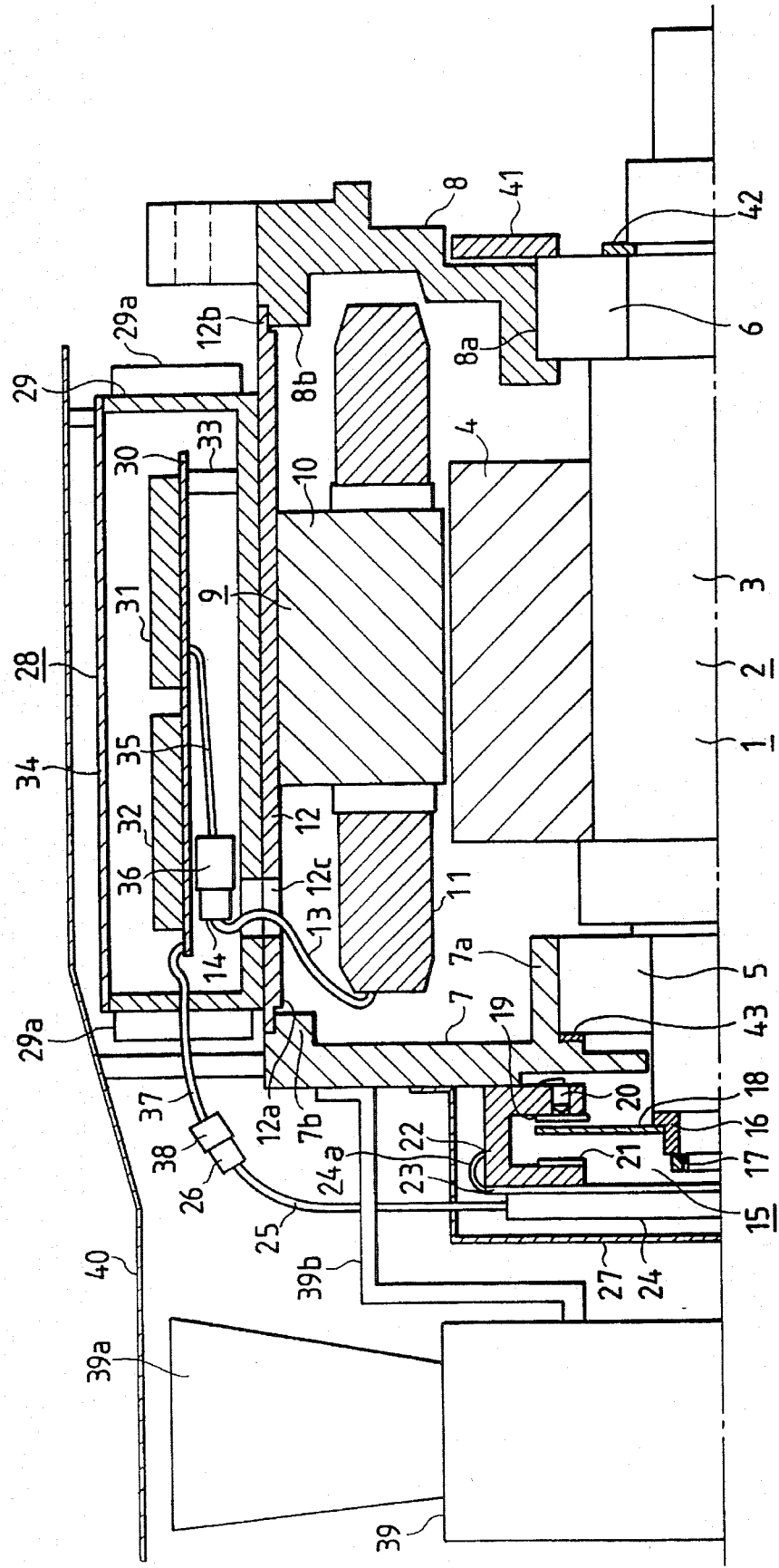
FIG. 13 is a vertical sectional view of a servo motor integral with a control apparatus known in the conventional art.
Figure 15:
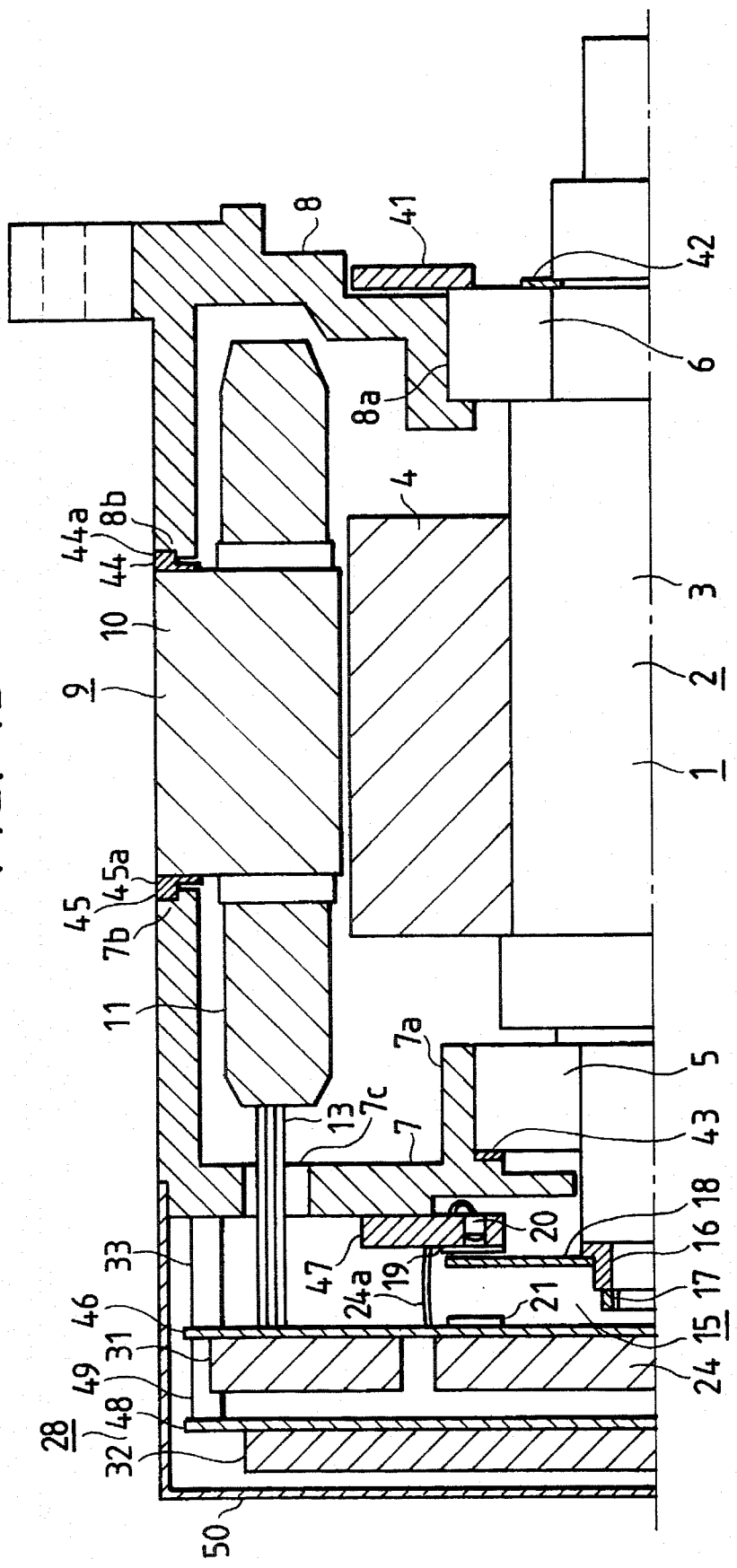
FIG. 15 is a vertical sectional view of a servo motor integral with a control apparatus known in the conventional art.

A final embodiment of the present invention will now be described with reference to FIGS. 11 and 12. FIG. 11 is a plan view and FIG. 12 is a top view, both of which show the present embodiment wherein there are a plurality of cooling fins 55a on the servo motor section 1 and a plurality of cooling fins 51a on the amplifier section 28, these fins are identical in number, and the cooling fins 55a, 51a are disposed straight in the rotary shaft direction, respectively.

In the servo motor integral with the control apparatus according to this arrangement, heated air adjacent to the cooling fins 55a, 51a rises easily along the cooling fins 55a, 51a when the servo motor is used upright, whereby a convection is generated easily and a temperature rise is lowered.

Whereas the power circuit 31 was provided on the printed circuit board 58 in previously described embodiments, the power circuit 31 may also be provided on the printed circuit board 60, the control circuit 32 and the signal processing circuit 24 provided on the printed circuit board 58, and a hole bored in the printed circuit board 58 to cause the plug 55b to pass through in order to produce the same effects (as in FIGS. 9 and 10).

Also, while only the cooling fins 55a are molded on the outer periphery of the core 10 of the stator 9 in the earlier embodiments, the cooling fins 55a may be disposed on the resin 55 provided uniformly thinly on the outer periphery of the core 10 to increase the intensity of the cooling fins 55a and improve the cooling efficiency.

Also, the condenser lenses 66, 70, the condenser lenses 67, 71, and the prisms 68, 69 employed in the optical unit 62 in the previous embodiments may be other optical elements. Also, while the reflected light of the required pattern 18a was detected, the entire rear surface of the pattern 18a of the rotary scale 18 may be changed into a mirror surface and a diffracted light generated from the required pattern 18a and reflected by the rear surface may be detected to provide the identical effects.

Also, whereas the power circuit 31, the printed circuit board 58 and the chassis 51 were molded integrally in a previous embodiment, the spacer 33 may be molded integrally with the resin 72 to reduce costs.

Also, the conductive pattern 74 built on one surface of the extension 51d of the chassis 51 may be provided on both surfaces to increase the integration density of the power circuit 31.

Also, while the extension 51e of the housing 51b was caused to abut on the end 34a of the cover 34 in previous embodiments, a packing material may be inserted to cause it to abut on them, whereby the entry of water and/or oil can be prevented reliably.

Also, the installation leg 39b built on the fan motor 39 in previous embodiments may be built on the cover 34 and molded integrally therewith to reduce costs.

Also, the fitting portion 3b of the ballscrew nut (not shown) provided on the ball bearing 6 side in previous embodiments may be provided on the ball bearing 5 side to produce the same effects.

It is to be understood that any of the embodiments described above can be used with an induction type servo motor in which the permanent magnet is a squirrel type rotor and can also be used with a combination of an inverter and a three-phase induction motor.

It will be apparent that the present invention, as described above, achieves a servo motor provided with a partition body which constitutes a partition between an amplifier section and a servo motor section and on which a housing for supporting the opposite-to-load side bearing of said servo motor section and a portion extending in the radial direction of said opposite-to-load side bearing from said housing are formed, whereby the housing of the bearing for supporting the rotary shaft has been eliminated from the opposite-to-load side bracket and the dimension in the rotary shaft direction is short. It will also be apparent that the present invention achieves a servo motor wherein a printed circuit board of said amplifier section is fitted to the portion extending in the radial direction of the opposite-to-load side bearing and constituting the partition body, a stationary portion of a detector which detects the velocity and/or rotary position of said servo motor section is provided on said printed circuit board, and a rotary portion of said detector is disposed between the opposite-to-load side bearing and a rotor core constituting a rotor, whereby the supporting rigidity of the printed circuit board has increased, vibration reliability has improved, connection lead wires are not required, automatic assembling is enabled, and costs are reduced.

It will also be apparent that the present invention achieves a servo motor wherein a semiconductor laser, a light receiving device, etc., are integrated into an optical unit, the semiconductor laser is employed, and a gap between the optical unit and the rotary scale has been increased, whereby the optical unit can be inserted into the printed circuit board automatically, the servo motor may be assembled in a dustproof room because dirt does not enter the gap, and costs can be reduced.

It will also be apparent that the present invention achieves a servo motor integral with a control apparatus wherein the rotor and stator are molded by a resin to simplify the surface shape, whereby cleaning is facilitated, the amount of dirt stuck on the rotary scale is reduced, and reliability improves. Also, the coil lead extensions of the stator and a connection are molded integrally and the printed circuit board is provided with a connection coupled disconnectibly with said connection, whereby wiring is not required and automatic assembling is enabled.

It will also be apparent that the present invention achieves a servo motor wherein the contact length of the connection formed integrally with the resin for molding the stator and the connection fitted to the printed circuit board of the amplifier section is shorter than the fitting length of the housing for supporting the opposite-to-load side bearing of the servo motor section and the bearing supported by said housing, whereby the opposite-to-load side bearing fitted into the housing serves as the guide for connection of the coil lead extensions of the servo motor stator and the amplifier section to facilitate the assembling.

It will also be apparent that the present invention achieves a servo motor wherein the coil lead extensions are molded integrally with the stator of the servo motor by a resin and connected to the printed circuit board, whereby costs are lowered.

It will also be apparent that the present invention achieves a servo motor wherein the printed circuit board of the power circuit is molded integrally with the partition body by a high heat transfer resin, whereby the temperature rise of the servo motor is reduced.

It will also be apparent that the present invention achieves a servo motor wherein part of the partition body is extended and coated with an electrical insulation material on which a conductive pattern is formed for use as a metal printed circuit board, whereby the heat transfer performance of the power circuit is improved and the temperature rise of the servo motor is reduced.

It will also be apparent that the present invention achieves a servo motor integral with a control apparatus of a two shaft end feature wherein a hole is formed in the printed circuit board of the amplifier section and the cover of said amplifier section and a portion opposed to the rotary shaft of the housing for supporting the opposite-to-load side bearing of the servo motor section is extended in the rotary shaft direction to abut on said cover, whereby it is difficult for water and/or oil to enter.

It will also be apparent that the present invention achieves a servo motor wherein a fan motor can be installed easily, the amplifier section does not shut up a wind path, and noise does not increase, and further the cooling efficiency of the amplifier section is improved.

It will also be apparent that the present invention achieves a servo motor wherein a plurality of cooling fins disposed on the outer periphery of the stator and molded integrally with said stator by a resin and a plurality of cooling fins formed and disposed integrally with the partition body of the amplifier section are identical in number and are disposed on straight lines in the rotary shaft direction of the servo motor section, whereby temperature rise is reduced.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. An integral servo motor and control unit, comprising:
   an amplifier section,
   a partition body, and
   a servo motor section;
   wherein said servo motor section comprises:
      a frame,
         a rotor having a rotor core with a permanent magnet defining a plurality of poles,
         a rotary shaft to which said rotor is affixed, said shaft being supported by an opposite-to-load side bearing and a load side bearing, said bearings being fitted to and supported by said partition body and a first bracket, respectively, and
         a stator having a core and a coil wound around said core and being affixed to said frame;
   wherein said partition body comprises:
      a first portion between said amplifier section and said servo motor section,
      a housing for supporting said opposite-to-load side bearing of said servo motor section, and
      a second portion extending in the radial direction of said opposite-to-load side bearing from said housing, said housing and said second portion being formed on said partition body; and
   wherein said amplifier section comprises:
      a printed circuit board fitted to said second portion, and
      a detector, comprising:
         a stationary portion (1) for detecting at least one of the velocity and the rotary position of said servo motor section and (2) being fitted to said printed circuit board, and
         a rotary portion disposed between said opposite-to-load side bearing of said servo motor section and said rotor core.

2. The integral unit as defined in claim 1, wherein:
   said stationary portion of said detector comprises:
      a signal processing circuit, and
      an optical unit having at least a semiconductor laser and a light receiving device; and
   said rotary portion of said optical unit and said rotary scale are opposed to each other, with a required gap provided therebetween.

3. The integral unit as defined in claim 1, further comprising:
   a fan motor, and an installation seat for said fan motor;

wherein said seat is fitted to a cover of said amplifier section, and wherein said cover is provided with a plurality of cooling fins.

4. An integral servo motor and control unit, comprising:

an amplifier section, a partition body, and a servo motor section;

wherein said servo motor section comprises:
- a frame,
- a rotor having a rotor core with a permanent magnet defining a plurality of poles,
- a rotary shaft to which said rotor is affixed, said shaft being supported by an opposite-to-load side bearing and a load side bearing, said bearings being fitted to and supported by said partition body and a first bracket, respectively, and
- a stator having a core and a coil wound around said core and being affixed to said frame;

wherein said partition body comprises:
- a first portion between said amplifier section and said servo motor section,
- a housing for supporting said opposite-to-load side bearing of said servo motor section, and
- a second portion extending in the radial direction of said opposite-to-load side bearing from said housing, said housing and said second portion being formed on said partition body; and wherein said amplifier section comprises:
- a printed circuit board fitted to said second portion,
- a detector, comprising:
  - a stationary portion (1) for detecting at least one of the velocity and the rotary position of said servo motor section and (2) being fitted to said printed circuit board, and
  - a rotary portion disposed between said opposite-to-load side bearing of said servo motor section and said rotor core;

wherein said stator further comprises coil lead extensions;

wherein said extensions are molded by a resin and coupled with a connector formed integrally with said resin; and wherein said connection is disconnectibly coupled with a connection fitted to said printed circuit board of said amplifier section.

5. The integral unit as defined in claim 4, wherein:

a contact length of said connection formed integrally with said resin for molding said coil lead extensions of said stator, and said connection fitted to said printed circuit board of said amplifier section is shorter than a fitting length of said housing for supporting said opposite-to-load side bearing and said bearing supported by said housing.

6. The integral unit as defined in claim 4, wherein:

said stator and said coil lead extensions of said stator are molded integrally by said resin for use as a support, and the conductive portions of coil lead front ends projecting from said coil lead extensions are connected to the conductive pattern of said printed circuit board of said amplifier section.

7. The integral unit as defined in claim 4, further comprising:

a plurality of cooling fins disposed on the outer periphery of said stator and molded integrally with said stator by a resin;

wherein said plurality of cooling fins is formed and disposed integrally with said partition body of said amplifier section are identical in number and are disposed on straight lines in the rotary shaft direction of said servo motor section.

8. An integral servo motor and control unit, comprising:

an amplifier section, a partition body, and a servo motor section;

wherein said servo motor section comprises:
- a frame,
- a rotor having a rotor core with a permanent magnet defining a plurality of poles,
- a rotary shaft to which said rotor is affixed, said shaft being supported by an opposite-to-load side bearing and a load side bearing, said bearings being fitted to and supported by said partition body and a first bracket, respectively, and
- a stator having a core and a coil wound around said core and being affixed to said frame;

wherein said partition body comprises:
- a first portion between said amplifier section and said servo motor section,
- a housing for supporting said opposite-to-load side bearing of said servo motor section, and
- a second portion extending in the radial direction of said opposite-to-load side bearing from said housing, said housing and said second portion being formed on said partition body;

wherein said amplifier section comprises:
- a printed circuit board fitted to said second portion, and
- a detector, comprising:
  - a stationary portion (1) for detecting at least one of the velocity and the rotary position of said servo motor section and (2) being fitted to said printed circuit board, and
  - a rotary portion disposed between said opposite-to-load side bearing of said servo motor section and said rotor core; and wherein said integral servo motor and control unit further comprises a printed circuit board loaded with a power circuit and being molded integrally with said partition body by a high heat transfer resin.

9. An integral servo motor and control unit, comprising:

an amplifier section, a partition body, and a servo motor section;

wherein said servo motor section comprises:
- a frame,
- a rotor having a rotor core with a permanent magnet defining a plurality of poles,
- a rotary shaft to which said rotor is affixed, said shaft being supported by an opposite-to-load side bearing and a load side bearing, said bearings being fitted to and supported by said partition body and a first bracket, respectively, and
- a stator having a core and a coil wound around said core and being affixed to said frame;

wherein said partition body comprises:
- a first portion between said amplifier section and said servo motor section,
- a housing for supporting said opposite-to-load side bearing of said servo motor section, and
- a second portion extending in the radial direction of said opposite-to-load side bearing from said housing, Said housing and said second portion being formed on said partition body;

wherein said amplifier section comprises:
- a printed circuit board fitted to said second portion, and
- a detector, comprising:
  - a stationary portion (1) for detecting at least one of the velocity and the rotary position of said servo motor section and (2) being fitted to said printed circuit board, and
  - a rotary portion disposed between said opposite-to-load side bearing of said servo motor section and said rotor core;

wherein at least one part of said partition body is extended, is coated with an electrical insulation material, and has a conductive pattern formed thereon.

10. An integral servo motor and control unit, comprising:
an amplifier section,
a partition body, and
a servo motor section;
wherein said servo motor section comprises:
- a frame,
- a rotor having a rotor core with a permanent magnet defining a plurality of poles,
- a rotary shaft to which said rotor is affixed, said shaft being supported by an opposite-to-load side bearing and a load side bearing, said bearings being fitted to and supported by said partition body and a first bracket, respectively, and
- a stator having a core and a coil wound around said core and being affixed to said frame;

wherein said partition body comprises:
- a first portion between said amplifier section and said servo motor section,
- a housing for supporting said opposite-to-load side bearing of said servo motor section, and
- a second portion extending in the radial direction of said opposite-to-load side bearing from said housing, said housing and said second portion being formed on said partition body;

wherein said amplifier section comprises:
- a printed circuit board fitted to said second portion, and
- a detector, comprising:
  - a stationary portion (1) for detecting at least one of the velocity and the rotary position of said servo motor section and (2) being fitted to said printed circuit board, and
  - a rotary portion disposed between said opposite-to-load side bearing of said servo motor section and said rotor core;

wherein a first hole is formed in said printed circuit board of said amplifier section;

wherein a second hole is formed in a cover of said amplifier section; and wherein a portion opposed to a rotary shaft of said housing for supporting said opposite-to-load side bearing is extended in the rotary shaft direction to abut said cover.

* * * * *